Nov. 4, 1969   R. R. HARRISON   3,475,911
POWER CONTROL MECHANISM FOR OUTBOARD MOTORS AND THE LIKE
Filed Feb. 1, 1968   2 Sheets-Sheet 1
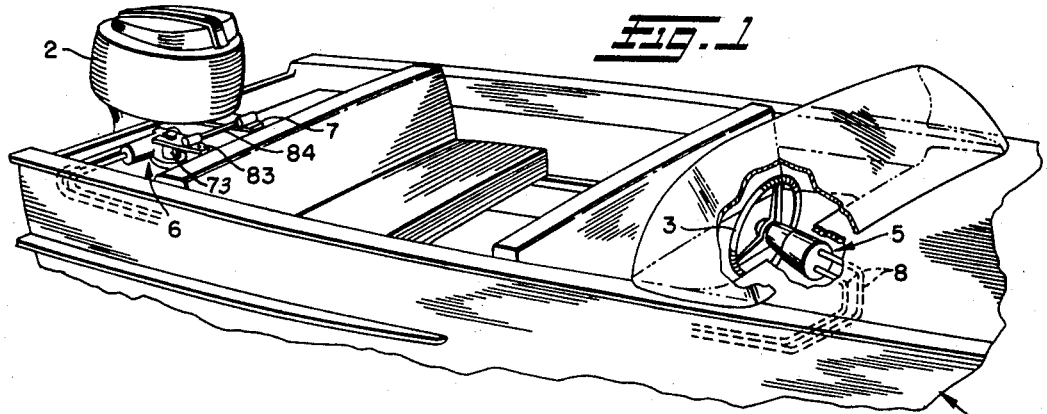
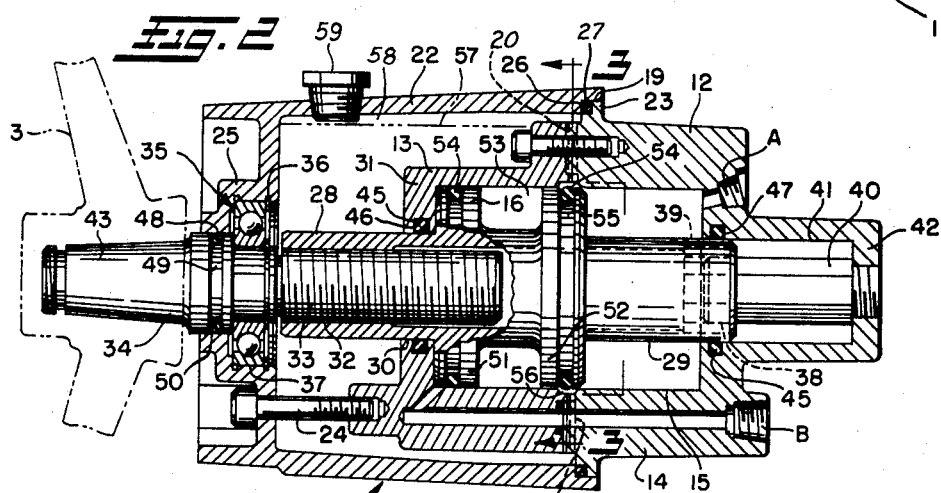
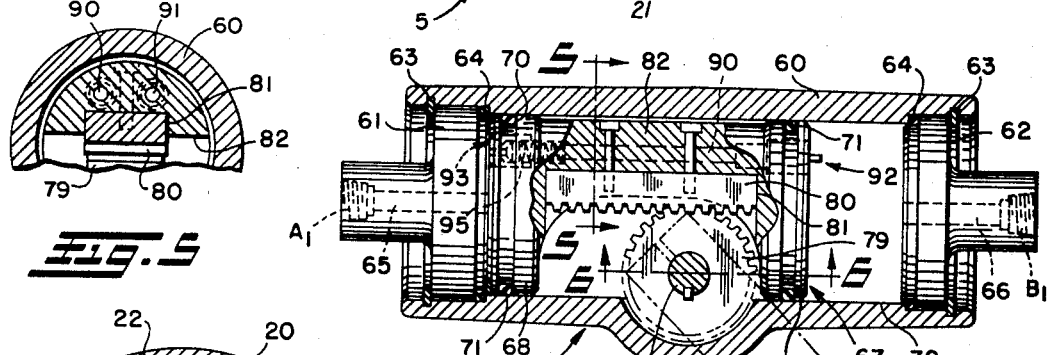
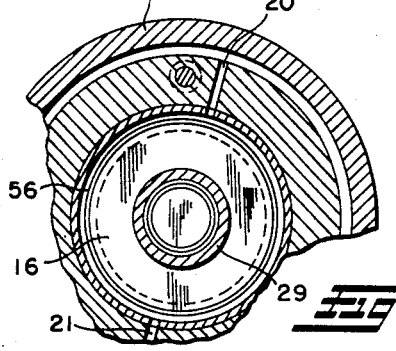
INVENTOR
ROBERT R. HARRISON
BY Oberlin, Maky, Donnelly & Renner
ATTORNEYS

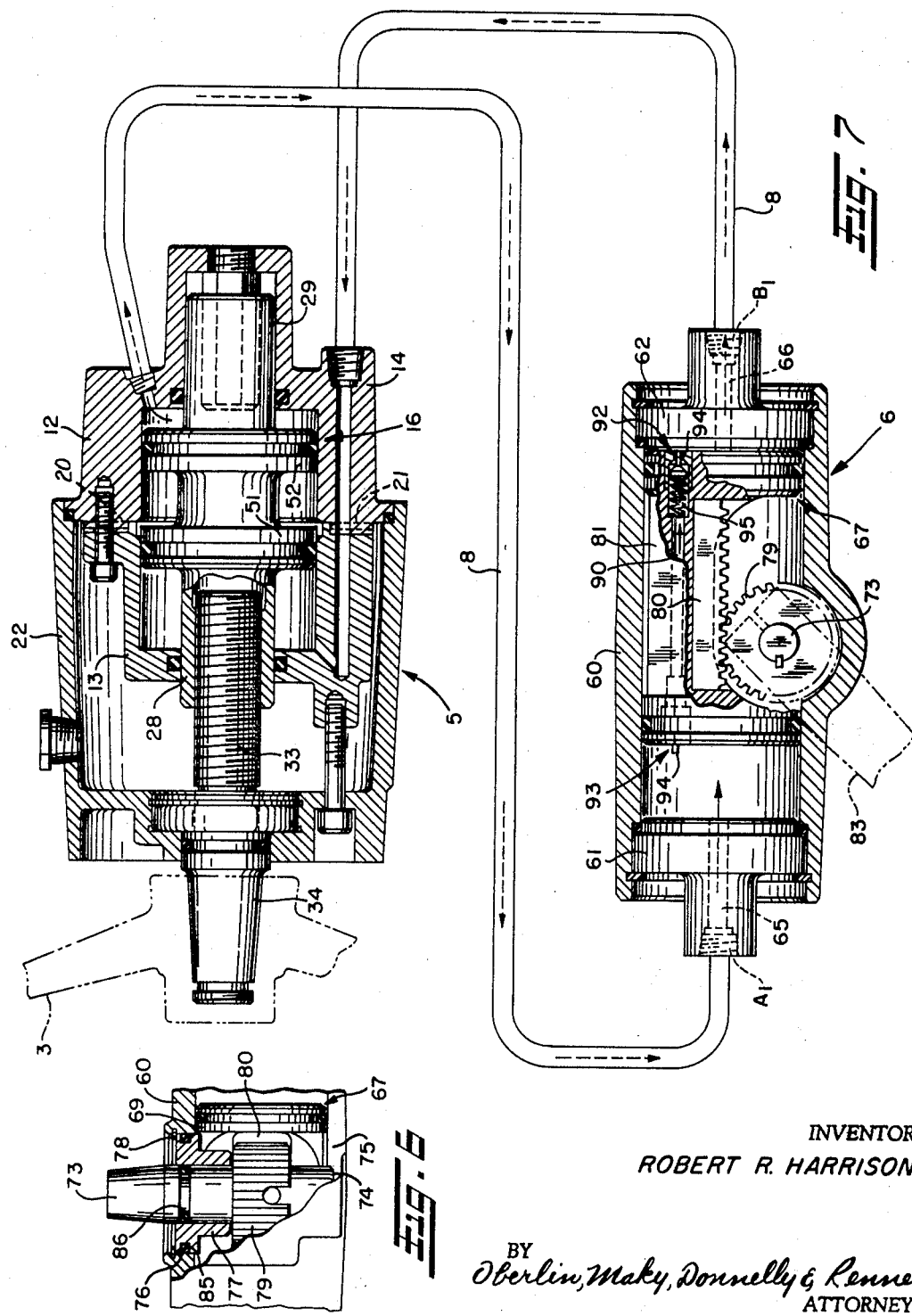

United States Patent Office 3,475,911
Patented Nov. 4, 1969

3,475,911
POWER CONTROL MECHANISM FOR OUTBOARD MOTORS AND THE LIKE
Robert R. Harrison, Elyria, Ohio, assignor to Nemo Corporation, Cleveland, Ohio, a corporation of Ohio
Filed Feb. 1, 1968, Ser. No. 702,255
Int. Cl. F15b 7/08, 17/00; B60t 11/10
U.S. Cl. 60—54.5
14 Claims

ABSTRACT OF THE DISCLOSURE

A power control mechanism including a double acting master cylinder operatively connected to a slave cylinder for supplying hydraulic fluid thereto in response to movements of the master piston. A central port in the wall of the master cylinder communicates the master cylinder with a reservoir for bleeding one or the other side of a closed hydraulic system at the end of each stroke of the master piston, and relief valves in opposite ends of the slave piston permit excessive fluid to pass from one side of the piston to the other for synchronizing the master and slave pistons in the event that the slave piston reaches the end of its stroke ahead of the master piston.

BACKGROUND OF THE INVENTION

This invention relates generally as indicated to a power control mechanism for outboard motors and the like and more particularly to certain improvements in power control mechanisms, especially of the type shown in Patent No. 3,307,356, granted to Robert R. Harrison on Mar. 7, 1967.

In such Patent No. 3,307,356 there is disclosed a motion transmitting system including a master cylinder and slave unit connected together by a single fluid line in such a manner that movements of the master piston are transmitted to the slave unit to cause corresponding movements of the slave piston. The master piston is reciprocated through rotation of a drive shaft and has a coil spring connected thereto for biasing the drive shaft in one rotative direction, whereas the slave piston has a driven shaft connected thereto which is biased by a similar type coil spring in the opposite rotative direction. Accordingly, even though there may be a loss of fluid in the system, the oppositely acting forces of the spring will always maintain the fluid between the pistons under pressure, thereby precluding air from accumulating in the system for quick response.

SUMMARY OF THE INVENTION

In general the motion transmitting system of Patent No. 3,307,356 has proven to be quite satisfactory in operation, but there is a definite need for a more simplified and less expensive power control mechanism having substantially the same advantages, which is the principal object of this present invention. It has been found that the spring bias of the driving and driven shafts can be eliminated without air accumulation in the system by providing a double acting master cylinder and slave unit with means for bleeding air from the system at the end of each stroke of the master piston. On the return stroke, the master and slave pistons are automatically synchronized by relief valves in opposite ends of the slave piston which automatically open to permit fluid to pass from one side of the slave piston to the other in the event that the slave piston reaches the end of its stroke before the master piston.

Relief valves have previously been incorporated in slave pistons to relieve excess hydraulic fluid on the side of a piston; see for example, the hydraulic control mechanism of Schroeder Patent No. 2,891,498, granted June 23, 1959. However, such relief valves have not been used in conjunction with an automatic bleeding system of the type incorporated in the mechanism of the present invention. In Schroeder, any loss of hydraulic fluid must be replenished by actuation of a pump connected to the system.

It is accordingly another object of this invention to provide a power control mechanism with novel means for automatically bleeding the fluid system at the end of each stroke of the master piston.

A further object is to provide a power control mechanism of the type described in which the master and slave pistons are automatically synchronized at the end of each stroke of the master piston to provide a proper balance of fluid on opposite sides of the system.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

BRIEF DESCRIPTION OF THE DRAWINGS

In the annexed drawings:

FIG. 1 is a fragmentary perspective view of a boat of conventional type having a preferred form of power control mechanism in accordance with this invention operatively connected to the motor and steering wheel;

FIG. 2 and 4 are longitudinal sectional views through the master and slave units, respectively, for the power control mechanism of FIG. 1;

FIGS. 3 and 5 are respectively fragmentary transverse sections through the master and slave units of FIGS. 2 and 4;

FIG. 6 is a fragmentary section through the slave unit of FIG. 4; and

FIG. 7 is a schematic section showing the manner in which the slave piston and master piston are automatically brought into synchronism with each other.

DESCRIPTION OF THE PREFERRED EMBODIMENT

Referring now in detail to the drawings and first especially to FIG. 1, there is shown a power control mechanism 1 in accordance with this invention operatively connected to the motor 2 and steering wheel 3 of an outboard motor boat for turning the motor 2 in response to turning movements of the steering wheel 3.

The power control mechanism 1 comprises two main components; a master unit 5 which provides a mount for the steering wheel 3 may be located at any convenient place in the boat; and a slave unit 6 adapted to be mounted at the rear of the boat adjacent the motor 2 for connection to the tiller handle 7. Nylon or other suitable pressure tubing 8 connects the slave unit 6 to the master unit 5 for actuation of the slave unit 6 in a manner to be subsequently fully explained.

As shown in FIGS. 2 and 3, the master unit 5 includes a double-acting master cylinder 12 desirably formed in two parts 13 and 14 which are bolted or otherwise secured together to provide a single chamber 15 having a piston 16 reciprocable therein. Intermediate the ends of the chamber 15 there are upper and lower radial passages 20 and 21 communicating the interior of the chamber 15 with a reservoir 22 surrounding at least a portion of the master cylinder 12. In the preferred form shown, one of the parts 14 has a radial flange 23 adjacent the passages 20, 21 which is received in a counterbore 19 in the larger end of the reservoir 22, and the entire other part 13 and passages 20, 21 are contained within the reservoir. Screws 24 or other suitable fasteners extend through the end wall 25 of the reservoir 22 into the adjacent end of the cylinder part 13 for securing the master cylinder 12 to the reservoir 22. Tightening of the screws 24 draws the radial flange 23 against the bottom 26 of the counterbore 19, compressing an O-ring 27 therebetween to provide a fluid-tight joint.

Opposite ends of the piston 16 have guide sleeves 28, 29 attached thereto. The guide sleeve 28 projects through an opening 30 in the end wall 31 of the cylinder part 13 and is internally threaded at 32 so that it may be threaded onto the inner end 33 of a screw shaft 34 journalled in suitable thrust bearings 35 in the end wall 25 of the reservoir. Snap rings 36 or the like may be used to secure the thrust bearings 35 within an annular recess 37 in the end wall 25.

The other guide sleeve 29 has an internal hex nut 38 pressed into a counterbore 39 therein which is slidably received on a hex guide 40 fixedly mounted in a cylindrical recess 41 in the end wall 42 of the cylinder section 13 to restrain the piston 16 against rotation during turning of the steering wheel 3 which is suitably mounted on the outer end 43 of the screw shaft 34. Thus, turning of the steering wheel 3 in opposite directions will cause a corresponding reciprocating movement of the piston 16 within the chamber 15.

O-rings 45 contained in grooves 46, 47 in the end walls 31, 42 of the cylinder 12 establish a fluid-tight seal with the guide sleeves 28, 29 to preclude leakage of fluid from the chamber 15, whereas a similar type O-ring seal 48 contained in an annular groove 49 in the screw shaft 34 precludes leakage from the reservoir 22 through the opening 50 in the end wall 25 through which the screw shaft 34 projects.

The piston 16 consists of a pair of axially spaced apart lands 51, 52 separated by an annular groove 53, such lands 51, 52 being in close sliding contact with the wall of the chamber 15 and having seals 54 confined in annular grooves 55 that are in sealing contact with the chamber wall. When the piston 16 is at either end of its stroke, one or the other of the seals 54 is located within an annular bleed port 56 intermediate the ends of the chamber 15 out of engagement with the chamber wall. The bleed port 56 communicates with the reservoir 22 via the passages 20, 21 whereby should there be any air in the hydraulic circuit on the side of the piston 16 vented to the reservoir, it will be permitted to escape through the upper passage 20 and replaced by hydraulic fluid entering from the reservoir 22 through the lower passage 21. The level 57 of fluid within the reservoir 22 should always be maintained somewhat less than full to provide an air space 58 at the top of the reservoir for the escape of trapped air from the closed fluid system. Fluid may be added to the reservoir as required by removal of a plug 59 in the top thereof.

In FIG. 2 the piston 16 is shown at the left end of the chamber 15, which causes the right end to be bled of air. During movement of the piston in the opposite direction, the fluid ahead of the piston is trapped in the right end of the chamber 15 by re-engagement of the right seal 54 with the wall of the chamber, whereby the fluid is forced under pressure out of the port A for flow through the associated pressure tube 8 to one of the ports $A_1$ of the slave unit 6. Movement of the piston 16 toward the left end causes fluid to be forced under pressure out of the port B to the other port $B_1$ of the slave unit.

As seen in FIGS. 4–6, the slave unit 6 comprises a cylinder 60 having a pair of end plates 61, 62 mounted in opposite ends thereof by snap rings 63 or the like and sealed by O-rings 64. The end plates 61, 62 contain the respective ports $A_1$, $B_1$ and have central passages 65, 66 communicating the ports $A_1$, $B_1$ with the interior of the cylinder 60. Slidable within the cylinder 60 is a slave piston 67 having a pair of axially spaced apart lands 68, 69 each provided with an annular groove 70 containing a seal 71 in wiping and sealing contact with the inner wall 72 of the cylinder 60. Intermediate the lands 68 and 69, the slave piston 67 is relieved to provide clearance for an output shaft 73 extending transversely through the cylinder 60 intermediate the ends thereof. One end of the output shaft 73 may be bottomed in a recess 74 in the wall 75 of the cylinder, whereas the other end extends through an opening 76 in the cylinder wall and is held in place by a sleeve bearing 77 retained in the opening 76 by a snap ring 78 or the like (see FIG. 6). Suitable seals 85, 86 contained in annular grooves in the sleeve bearing 77 and output shaft 73 preclude leakage from the cylinder 60 through the opening 76.

The output shaft 73 has a pinion 79 keyed thereto in meshing engagement with a rack 80 received in a slot 81 in the reduced central portion 82 of the piston 67, whereby axial movement of the piston 67 causes rotation of the output shaft 73 which may be connected to the tiller handle 7 of the motor 2 by means of a control arm 83 and steering rod 84 to effect movement of the motor 2 in the intended direction for steering the boat in known manner.

Ideally, the fluid system should be completely fluid-tight so that no air can enter into the system and a proper balance of the fluid on opposite sides of the master and slave pistons 16 and 67 is always maintained to maintain the pistons in proper synchronism so that turning of the steering wheel 3 in opposite directions will cause a corresponding turning movement of the motor 2 to the extent desired. However, as a practical matter, fluid will gradually escape from the system which is especially likely to occur during the making of sharp turns because of the substantially increased pressures which are encountered at that time.

Any loss of fluid will be made up during a hard right or hard left turn of the steering wheel 3 which moves the master piston 16 to the end of its stroke for purging the system through the passages 20, 21 in the manner previously described. However, at the same time the fluid system may become out of balance with more fluid on one side of the system than on the other. If that happens, the master piston 16 or slave piston 67 may reach the end of its stroke before the other, thus restricting the turning range of the motor.

To overcome this unbalance and bring the pistons 16, 67 back into synchronism, a pair of passages 90, 91 are provided in the slave piston 67, extending from one end to the other, with poppet relief valves 92, 93 in the passages 90, 91 adjacent opposite ends of the piston. Normally, the relief valves 92, 93 are spring biased to the closed position, whereby the fluid pressure which is supplied from the master cylinder 12 to the slave cylinder 60 through reciprocation of the master piston 16 will cause a corresponding movement of the slave piston 67. However, should the slave piston 67 reach the end of its stroke before the master piston 16 does as shown in FIG. 7, which will occur when there is an unbalance in the system and the steering wheel 3 is on a hard turn, engagement of the extension 94 of the poppet valve 92 with the end wall of the slave cylinder will cause the poppet valve to open and relieve the excess pressure from one side of the piston to the other. The other poppet valve 93 will open to assist in relieving the pressure if it exceeds the setting of the valve spring 95. Any excess fluid will be released through the annular bleed port 56 back to the reservoir 22 when the master piston 16 reaches the end of its stroke. Now the pressure is balanced and the open poppet valve will automatically close and remain closed so long as there is no further escape of oil and the system remains synchronized.

Although the power control mechanism 1 disclosed herein has been discussed with specific reference to its use for steering an outboard motor, it will be apparent that it is equally well suited for steering the rudder of an inboard motor boat, and may have other uses as well, as for example, the remote control of motors, valves, or any other mechanism which is to be shifted. The power control device disclosed herein is quite simple in construction and operation and yet automatically provides a balanced hydraulic system for instant response under all conditions, since any loss of fluid in the system is automatically made up and the fluid system synchronized every time the master piston is moved to either end of its stroke. Thus, the system is filled with oil, purged of air, and synchronized in one simple operation using only the steering wheel.

Other modes of applying the principles of the invention may be employed, change being made as regards the details described, provided the features stated in any of the following claims or the equivalent of such be employed.

I, therefore, particularly point out and distinctly claim as my invention:

1. A master unit comprising a double-acting piston-cylinder assembly, said piston including a pair of axially spaced apart lands having annular grooves containing seals in sealing contact with the wall of said cylinder, said cylinder intermediate its ends having an annular bleed port which provides a clearance between one of said seals and said cylinder wall when said piston is at either end of its stroke, and passage means communicating with said bleed port for bleeding air trapped on the side of said piston adjacent said one seal located at said bleed port.

2. The master unit of claim 1 further comprising additional passage means communicating with said bleed port for supplying make-up fluid to the side of said piston adjacent said one seal located at said bleed port.

3. The master unit of claim 2 further comprising a reservoir surrounding at least a portion of said cylinder, said additional passage means communicating with said reservoir for supplying fluid from said reservoir to said cylinder as aforesaid.

4. The master unit of claim 3 wherein said first-mentioned passage means also communicates with said reservoir, said reservoir having an air space above the fluid level therein for the air escaping from said cylinder.

5. The master unit of claim 4 wherein said cylinder comprises two parts secured together in axial alignment with each other, one of said parts having a radial flange, said reservoir having a counterbore in one end in which said radial flange is received with the other part completely contained in said reservoir.

6. The master unit of claim 1 wherein said piston has an internally threaded sleeve on one end, there is a shaft extending through said cyilnder into said sleeve and in threaded engagement therewith, and means are provided for precluding rotation of said piston, whereby rotation of said shaft in opposite directions causes axial movement of said piston.

7. The master unit of claim 6 wherein said means for precluding rotation of said piston comprises a guide sleeve projecting from the other end of said piston, an annular recess in the end of said cylinder adjacent said guide sleeve for receipt of said guide sleeve therein, said recess having a multi-sided guide fixedly mounted therein, and said guide sleeve having a multi-sided nut therein which is in sliding engagement with said guide.

8. The master unit of claim 6 wherein said sleeve extends through an opening in said cylinder to assist in guiding said piston during such axial movement.

9. In combination, a master unit and a slave unit operatively connected to said master unit, said master unit comprising a double-acting piston-cylinder assembly, said piston including a pair of axially spaced apart lands having annular grooves containing seals in sealing engagement with the wall of said cylinder, said cylinder intermediate its ends having an annular bleed port which provides a clearance between one of said seals and said cylinder wall when said piston is at either end of its stroke, and passage means communicating with said bleed port for bleeding air trapped on the side of said piston adjacent said one seal located at said bleed port; and said slave unit comprising a piston-cylinder assembly having opposite ends operatively connected to opposite ends of said master piston-cylinder assembly, said slave piston having a pair of passages therein extending from one end to the other, and relief valve means in said passages for permitting fluid to flow through said slave piston from one side to the other in the event that said slave piston reaches the end of its stroke before said master piston, thereby permitting continued movement of said master piston to the end of its stroke for synchronizing said master and slave pistons.

10. The combination of claim 9 wherein said slave piston is relieved intermediate its end to provide clearance for an output shaft, and means are provided for mounting said output shaft for rotation within said slave cylinder, said output shaft having a pinion thereon within said slave cylinder, and said slave piston having a rack in meshing engagement with said pinion, whereby axial movement of said slave piston causes rotation of said output shaft.

11. The combination of claim 10 wherein said means mounting said output shaft for rotation comprises a recess in the wall of said slave cylinder in which one end of said output shaft is received, and an opening in said slave cylinder wall opposite said recess through which the other end of said output shaft extends, said other end of said output shaft being held in place by a sleeve bearing in said opening.

12. The combination of claim 9 further comprising additional passage means communicating with said bleed port in said master cylinder for supplying fluid to the side of said master piston adjacent said one seal located at said bleed port.

13. The combination of claim 12 further comprising a reservoir surrounding at least a portion of such master cylinder, said additional passage means communicating with said reservoir for supplying fluid from said reservoir to said master cylinder, and said first-mentioned passage means also communicating with said reservoir, said reservoir having an air space above the fluid level therein for the air escaping from said master cylinder.

14. The combination of claim 9 wherein said master piston has a sleeve on one end, there is a shaft extending through said master cylinder into said sleeve and in threaded engagement therewith, a guide sleeve projecting from the other end of said master piston, an annular recess in the end of said master cylinder adjacent said guide sleeve for receipt of said guide sleeve therein, said recess having a multi-sided guide fixedly mounted therein, and said guide sleeve having a multi-sided nut therein which is in sliding engagement with said guide, whereby rotation of said shaft in opposite directions causes reciprocation of said master piston to force fluid into and out of said slave unit for actuating the same.

(References on following page)

References Cited

UNITED STATES PATENTS

| | | | |
|---|---|---|---|
| 2,855,755 | 10/1958 | Auger | 60—54.5 |
| 2,882,685 | 4/1959 | Carlsen et al. | 60—54.5 |
| 2,891,498 | 6/1959 | Schroeder | 60—54.5 XR |
| 3,034,300 | 5/1962 | Hachenberg | 60—54.5 |
| 3,048,978 | 8/1962 | Hare | 60—54.5 |
| 3,242,675 | 3/1966 | Norton | 60—54.5 |
| 3,307,356 | 3/1967 | Harrison | 60—54.5 |

MARTIN P. SCHWADRON, Primary Examiner

R. R. BUNEVICH, Assistant Examiner

U.S. Cl. X.R.

60—54.6; 188—152